US008066320B1

(12) United States Patent
Grabowski

(10) Patent No.: US 8,066,320 B1
(45) Date of Patent: Nov. 29, 2011

(54) DOOR HINGE

(75) Inventor: William A. Grabowski, Northville, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 12/947,101

(22) Filed: Nov. 16, 2010

(51) Int. Cl.
*B60J 5/00* (2006.01)

(52) U.S. Cl. ........................ 296/146.11; 16/334; 16/341

(58) Field of Classification Search ............. 296/146.11; 16/321, 334, 341
See application file for complete search history.

(56) References Cited

U.S. PATENT DOCUMENTS 4,644,699 A * 2/1987 Chandler et al. ................ 49/502
5,054,165 A * 10/1991 Marchione ....................... 16/270
7,585,013 B2 * 9/2009 Brown et al. ............ 296/146.11

* cited by examiner

*Primary Examiner* — Joseph Pape
(74) *Attorney, Agent, or Firm* — Frederick A. Krieger

(57) ABSTRACT

A hinge assembly includes a hinge member joined to a vehicle door. A cam member is disposed about a portion of the hinge member, and the cam member has a protrusion. A casing is joined to a body portion of the vehicle, and the casing has an aperture along an axis. The aperture is configured to receive a portion of the cam member therein, and the casing has a slot including a first detent configured so the protrusion of the cam member moves along the slot. A biasing member urges the cam member in a direction to move the door to a closed position. When the door is rotated to an open position, the protrusion moves along the slot to an engaged position with the first detent such that the door is maintained in the open position until the door is moved to disengage the protrusion from the first detent.

17 Claims, 3 Drawing Sheets

DOOR HINGE

FIELD

The present disclosure relates to a door hinge for a vehicle.

BACKGROUND

Door hinges may be both functional and aesthetic. A JEEP® Wrangler, for example, includes exposed door hinges that contribute to the aesthetics of the vehicle. Regarding functionality, a hinge allows a vehicle door to be opened and closed relative to a vehicle body. Further, utilizing the door hinge, the door may be separated from the vehicle. In some instances, it is desirable for the door to remain open in one or more positions until it is desired to return the door to a closed position.

SUMMARY

A hinge assembly for a vehicle door, including a hinge member joined to the door. A cam member is disposed about a portion of the hinge member, and the cam member has a protrusion. A casing is joined to a body portion of the vehicle, and the casing has an aperture along an axis. The aperture is configured to receive a portion of the cam member therein, and the casing has a slot configured so the protrusion of the cam member moves along the slot. The slot includes a first detent. A biasing member is configured and positioned to urge the cam member in a direction to move the door to a closed position. When the door is rotated about the axis to a first open position, the protrusion moves along the slot to an engaged position with the first detent such that the door is maintained at the first open position until the door is moved to disengage the protrusion from the first detent.

In another aspect of the disclosure, the biasing member is a torsion spring.

In another aspect of the disclosure, the biasing member is disposed within the aperture of the casing.

In another aspect of the disclosure, the casing includes a cylindrical-shaped portion disposed around the aperture of the casing.

In another aspect of the disclosure, the hinge member includes an elongated portion disposed along the axis, the elongated portion having a shaped region, and the cam member including a complementary shaped portion disposed about the shaped region.

In another aspect of the disclosure, the cam member slidably engages a surface of the elongated portion.

In another aspect of the disclosure, the slot includes a second detent, and when the door is rotated to a second open position, the protrusion moves along the slot to an engaged position with the second detent such that the door is maintained at the second open position until the door is moved to disengage the protrusion from the second detent.

In another aspect of the disclosure, the first hinge member is separable from the casing.

Further area of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
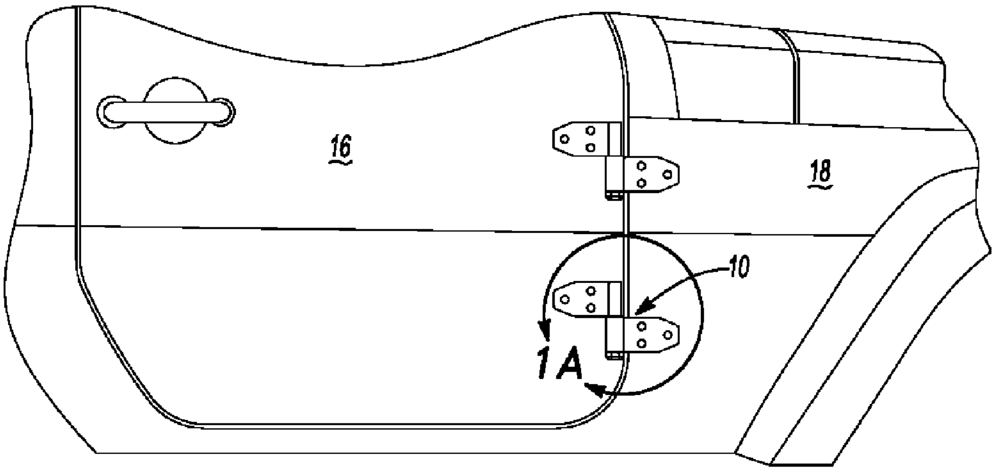
FIG. 1 illustrates a vehicle including a hinge assembly according to the present disclosure.
Figure 1A:
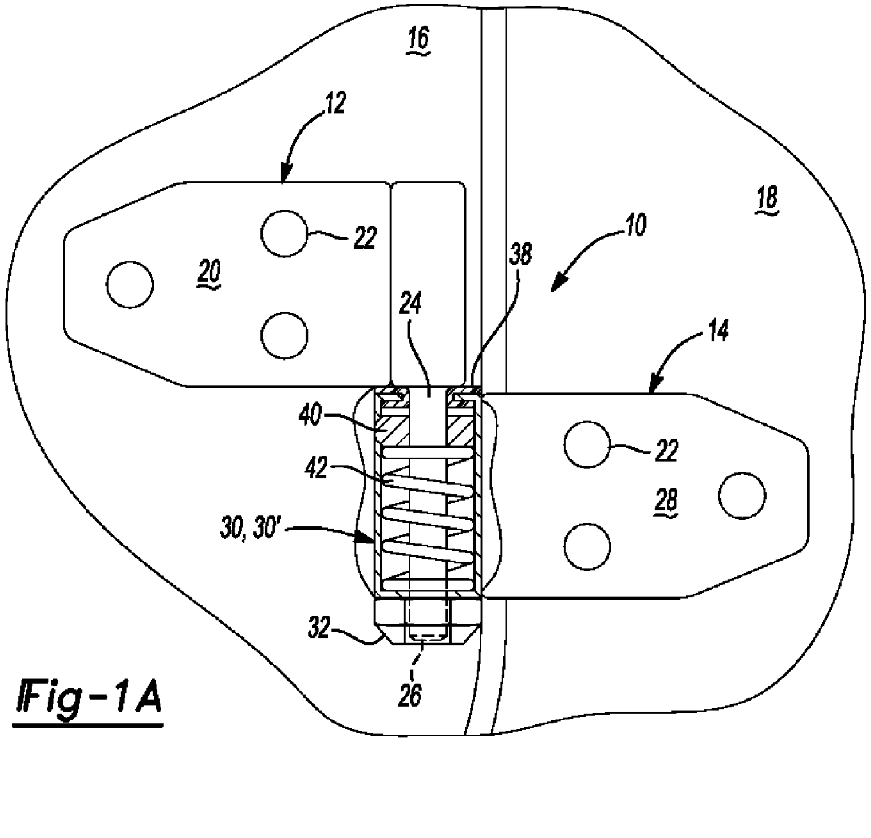
FIG. 1A illustrates an enlarged view of the hinge assembly illustrated in FIG. 1.
Figure 2:
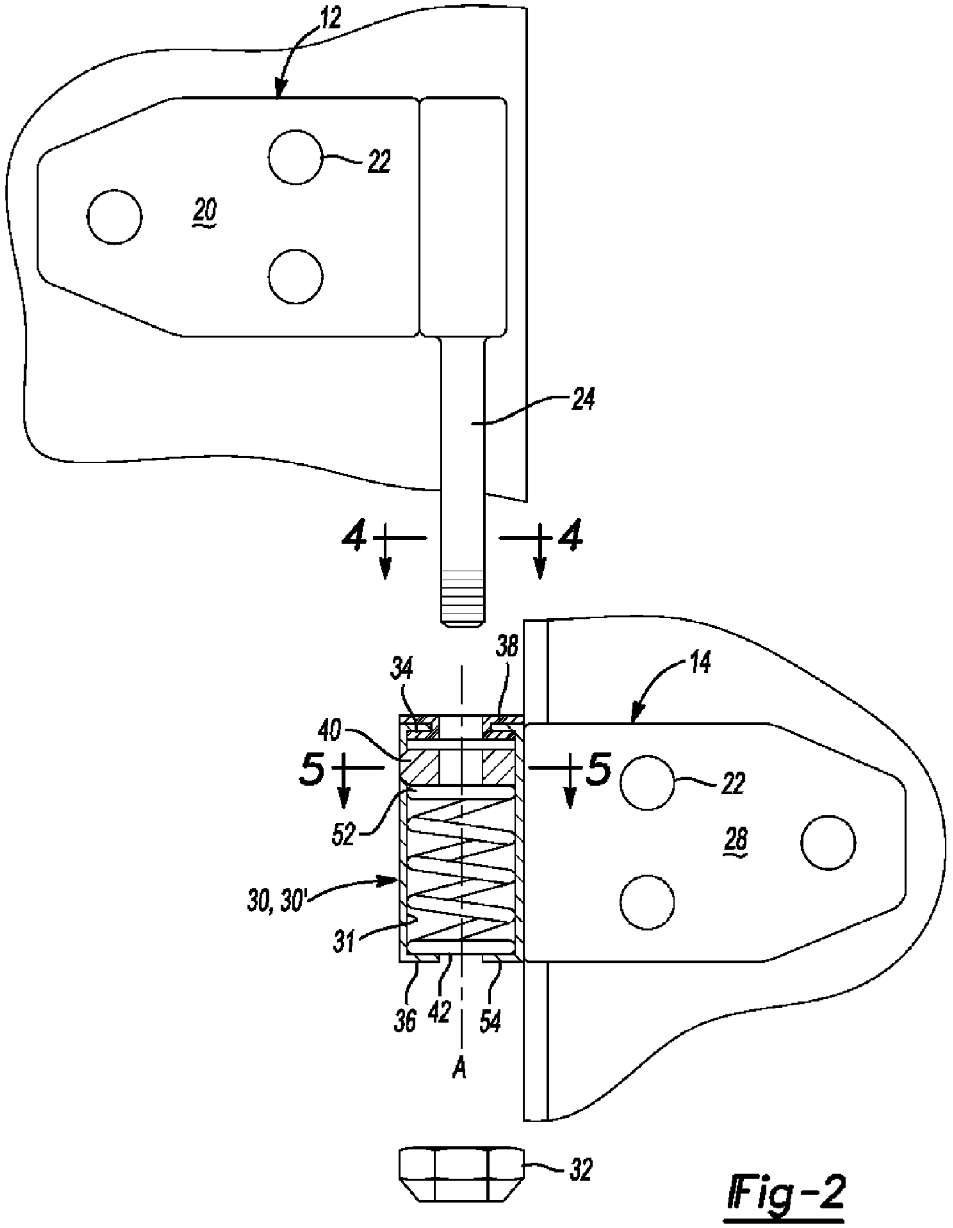
FIG. 2 is a cross-sectional view of the hinge assembly illustrated in FIG. 1A.
Figure 3:
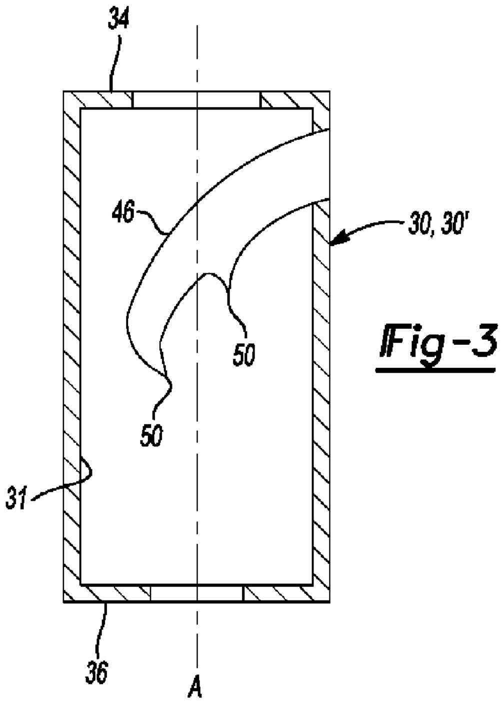
FIG. 3 is a cross-sectional view of a casing of the hinge assembly according to a principle of the present disclosure.

The present disclosure provides a door hinge configured to be operably maintained at one or more open positions and returned therefrom to a closed position. In an exemplary embodiment and referring to FIGS. 1-5, illustrated is a door hinge assembly 10 that includes a first hinge member 12 and a second hinge member 14. Door hinge assembly 10 shown in, for example, FIG. 1 is for a passenger-side door 16 of a motor vehicle 18. In this regard, first hinge member 12 is attached to door 16, while second hinge member 14 is attached to a body of vehicle 18. It should be understood, however, that hinge assembly 10 is equally applicable to a driver-side door.

First hinge member 12 includes a substantially planar attachment plate 20 including bolt holes 22 for securing first hinge member 12 to door 16 with bolts (not shown) or other known attachment devices. It should be understood, however, that first hinge member 12 is not necessarily secured to door 16 by bolts or the like. In contrast, first hinge member 12 may be secured to door 16 by welding, for example. Integral with attachment plate 20 is an elongated member or stud 24 having a free end 26 that may be threaded. Stud 24 may be integral with attachment plate 20 due to casting, or may be separately manufactured and then secured to attachment plate 20 by welding or some other attachment mechanism.

Second hinge member 14 includes an attachment plate 28, also including bolt holes 22 for securing second hinge member 14 to vehicle 18. Similar to first hinge member 12, second hinge member 14 is not necessarily secured to vehicle 18 by bolts or the like. In contrast, second hinge member 14 may be secured to vehicle 18 by welding, for example. Integral with attachment plate 28 is a casing 30. Casing 30 may be integral with attachment plate 28 due to casting, or may be separately manufactured and then secured to attachment plate 28 by welding or some other attachment mechanism.

Casing 30 receives stud 24 of first hinge member 12 therein. Casing 30 may be cylindrical having an aperture 31 along an axis A thereof. Although casing 30 is illustrated as being cylindrical, casing 30 should not be limited thereto. In contrast, casing 30 may be shaped in any manner so long as aperture 31 is defined along axis A thereof to receive stud 24 disposed therein along axis A. In this regard, casing 30 may be shaped to have a substantially planar portion adjacent to a body portion of vehicle 18.

To secure stud 24 to casing 30, a nut 32 may be threaded onto free end 26 that passes entirely through casing 30 from an entrance end 34 to an exit end 36. Nut 32 is movable along with stud 24 as stud 24 rotates. That is, although nut 32 is illustrated as being in direct contact with exit end 36 of casing 30, it should be understood that exit end 36 acts as a bearing surface for nut 32 such that when stud 24 is rotated when door 16 is opened relative to vehicle 18, nut 32 will rotate along with stud 24 without causing nut 32 to disengage from threaded end 26.

At entrance end 34 may be disposed a cap seal 38. Cap seal 38 may be formed from rubber or some other suitable sealing material that prevents dust or debris from entering casing 30. Further, cap seal 38 may assist in minimizing vibration of hinge assembly 10 when vehicle 18 is being driven. Cap seal 38 may also assist in reducing or preventing undesirable noises when door 16 is opened and closed relative to vehicle 18.

Figure 4:
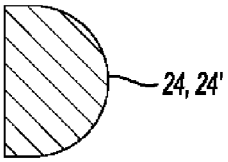
FIG. 4 is a cross-sectional view of a stud used in the hinge assembly according to a principle of the present disclosure.
Figure 5:
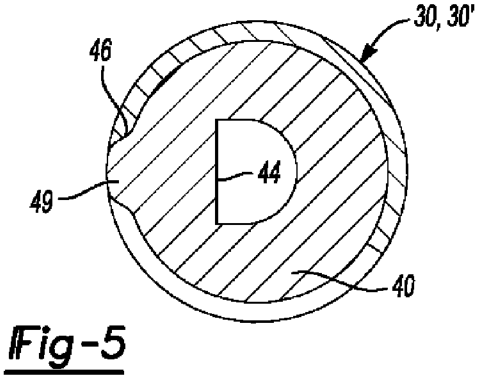
FIG. 5 is a cross-sectional view of a cam member of the hinge assembly according to a principle of the present disclosure.

Within aperture 31 defined by casing 30 is disposed a cam member 40 and a biasing member 42. In this exemplary embodiment, cam member 40 is an annular-shaped member that is engageable with stud 24, and is rotatable therewith. That is, as door 16 is opened relative to vehicle 18, stud 24 rotates within casing 30. As illustrated in FIG. 4, stud 24 may have a D-shaped cross-sectional portion that engages with a D-shaped aperture 44 formed in cam member 40 (see FIG. 5). Stud 24, however, may have any cross-sectional shaped portion that corresponds to a similarly shaped aperture 44 in cam member 40. For example, stud 24 may have a rectangular-shaped cross-sectional portion, a star-shaped cross-sectional portion, an elongated and shaped portion, triangular-shaped cross-sectional portion, etc. without limitation. Regardless, it should be understood that a shaped cross-sectional portion of stud 24 that engages with a complementary shaped aperture 44 in cam member 40 allows cam member 40 to rotate along with stud 24 when door 16 is opened/closed relative to vehicle 18.

In addition to being engaged with stud 24, cam member 40 is movably coupled to a slot 46 formed in a wall 48 of casing 30. To couple cam member 40 to slot 46, cam member 40 includes at least one protrusion 49 unitary therewith that is engagable with slot 46. As stated above, as door 16 is opened relative to vehicle 18, stud 24 and cam member 40 rotate within casing 30. As cam member 40 rotates within casing 30, protrusion 49 will follow along a path set by slot 46. As protrusion 49 moves through slot 46, cam member 40 moves axially within casing 30 by sliding along stud 24. As cam member 40 moves axially within casing 30 along a path set by slot 46, protrusion 49 may engage at least one detent 50 formed in slot 46.

As protrusion 49 engages detent 50, door 16 may be supported in an open position relative to vehicle 18. Due to a plurality of detents 50 being formed in slot 46, door 16 may be supported in a plurality of open positions relative to vehicle 18. Protrusion 49 and detents 50 are correspondingly shaped to allow protrusion 49 to easily enter and exit detent 50, when door 16 is opened/closed. That is, detent 50 and protrusion 49 are preferably shaped to allow protrusion 49 to sit within detent 50 when door 16 is desired to remain in an open position, and to allow protrusion 49 to exit detent 50 when sufficient force is applied to the door to move the protrusion from a detent.

Hinge assembly 10 further includes biasing member 42 configured and positioned to urge the cam member 40 in a direction to move the door to a closed position. To further assist in providing force suitable to enable protrusion 49 to exit detents 50 as well as assist in closing door 16, biasing member 42 may, in an exemplary embodiment, be a torsion spring having a proximate end 52 fixed to cam member 40 and a distal end 54 fixed at exit end 36 of casing 30. Because proximate end 52 of biasing member 42 is fixed to cam member 40 and distal end 54 is fixed to casing 30, biasing member 42 will develop potential energy as stud 24 when cam member 40 rotates within casing 30. That is, when door 16 is opened relative to vehicle 18, proximate end 52 of biasing member 42 will be pulled by cam member 40 as it rotates along with stud 24 within casing 30, which twists biasing member 42. If protrusion 49 of cam member 40 engages detent 50, the potential energy of biasing member 42 is stored until needed.

When the door is moved so as to move the protrusion 49 from one of the detents, the biasing member 42 is configured to return to an untorsioned state, which results in the potential energy changing to kinetic energy, and urges the door to move toward the closed position. This change to kinetic energy provides force to cam member 40 to assist in urging cam member 40 in moving back through slot 46. In other words, the potential energy developed by biasing member 42 when door 16 is opened changes to kinetic energy when door 16 begins to close, which assists in providing additional force to close door 16.

As stated above, hinge assembly 10 enables door 16 to be removed from vehicle 18. To remove door 16 from vehicle 18, the driver or passenger merely removes nut 32 from free end 26 of stud 24. Door 16 may then be lifted upward to separate stud 24 from casing 30. Due to cap seal 38, dust and debris is prevented, or at least substantially minimized, from entering into casing 30 when stud 24 is removed therefrom.

Figure 6:
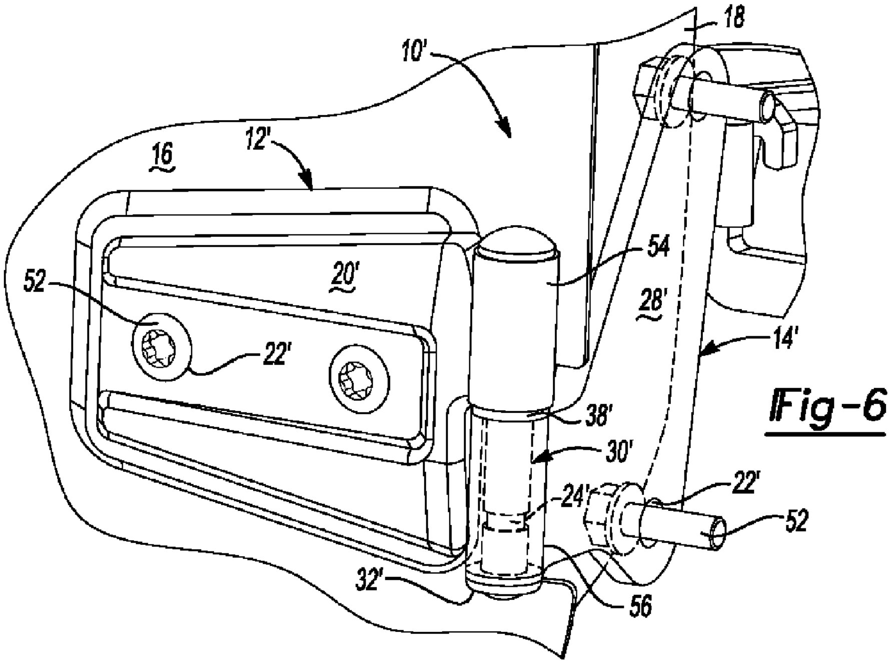
FIG. 6 is a perspective view of a hinge assembly according to another embodiment of the present disclosure.

FIG. 6 illustrates a hinge assembly 10' according to another embodiment of the present disclosure. Similar to hinge assembly 10 illustrated in FIGS. 1-5, hinge assembly 10' includes a first hinge member 12' and a second hinge member 14'. First hinge member 12' is attached to door 16, while second hinge member 14' is attached to a body of vehicle 18. It should be understood, however, that hinge assembly 10' is equally applicable to a driver-side door.

First hinge member 12' includes a substantially planar attachment plate 20' including bolt holes 22' for securing first hinge member 12' to door 16 with bolts 52 or other known attachment devices. It should be understood, however, that first hinge member 12' is not necessarily secured to door 16 by bolts 52 or the like. In contrast, first hinge member 12' may be secured to door 16 by welding, for example. Integral with attachment plate 20' is a first housing 54 for receiving an elongated member or stud 24'. First housing 54 may be integral with attachment plate 20' due to casting, or may be separately manufactured and then secured to attachment plate 20' by welding or some other attachment mechanism. Similar to stud 24 described above, stud 24' may have a D-shaped cross-sectional portion.

Second hinge member 14' includes an attachment plate 28', also including bolt holes 22' for securing second hinge member 14' to vehicle 18 by bolts 52. Similar to first hinge member 12', second hinge member 14' is not necessarily secured to vehicle 18 by bolts 52 or the like. In contrast, second hinge member 14' may be secured to vehicle 18 by welding, for example. Integral with attachment plate 28 is a second housing 56. Similar to first housing 54, second housing 56 may be integral with attachment plate 28' due to casting, or may be separately manufactured and then secured to attachment plate 28' by welding or some other attachment mechanism.

Disposed within second housing 56 is a casing 30' that receives stud 24' therein. Casing 30' is similar to casing 30 described above. That is, although not illustrated in FIG. 6, within casing 30' is disposed cam member 40, biasing member 42, and slot 46 including detents 50. Door 16, therefore, may be supported, therefore, in a plurality of open positions relative to vehicle 18.

Disposed between first and second housings 54 and 56 is a cap seal 38'. Cap seal 38' may be formed from rubber or some other suitable sealing material that prevents dust or debris from entering second housing 56 and casing 30'. Further, similar to cap seal 38, cap seal 38' may assist in deadening vibration of hinge assembly 10' when vehicle 18 is being driven, and may also assist in preventing the development of creaks or squeaks when door 16 is opened and closed relative to vehicle 18.

What is claimed is:

1. A hinge assembly for a vehicle door, comprising:

a hinge member joined to the door;

a cam member disposed about a portion of the hinge member, the cam member having a protrusion;

a casing joined to a body portion of the vehicle, the casing having an aperture along an axis, the aperture configured to receive a portion of the cam member therein, and the casing having a slot configured so the protrusion of the cam member moves along the slot, the slot including a first detent; and a biasing member configured and positioned to urge the cam member in a direction to move the door to a closed position, wherein when the door is rotated about the axis to a first open position, the protrusion moves along the slot to an engaged position with the first detent such that the door is maintained at the first open position until the door is moved to disengage the protrusion from the first detent.

2. The hinge assembly of claim 1, wherein the biasing member is a torsion spring.

3. The hinge assembly of claim 1, wherein the biasing member is disposed within the aperture of the casing.

4. The hinge assembly of claim 1, wherein the casing includes a cylindrical-shaped portion disposed around the aperture of the casing.

5. The hinge assembly of claim 4, wherein the casing includes a substantially planar portion joined to the body portion of the vehicle.

6. The hinge assembly of claim 1, further comprising a cap seal disposed between the first hinge member and the cam member.

7. The hinge assembly of claim 1, wherein the hinge member includes an elongated portion disposed along the axis, the elongated portion having a shaped region, and the cam member including a complementary shaped portion disposed about the shaped region.

8. The hinge assembly of claim 7, wherein the cam member slidably engages a surface of the elongated portion.

9. The hinge assembly of claim 1, wherein the slot includes a second detent, and when the door is rotated to a second open position, the protrusion moves along the slot to an engaged position with the second detent such that the door is maintained at the second open position until the door is moved to disengage the protrusion from the second detent.

10. The hinge assembly of claim 1, wherein the first hinge member is separable from the casing.

11. A hinge assembly, comprising:

a first member;

a second member;

a first hinge member fixed to said first member;

a casing fixed to said first hinge member, said casing defining an aperture having an axis;

a second hinge member fixed to said second member;

an elongated member fixed to said second hinge member that is disposed within said aperture along said axis, said elongated member having a D-shaped cross-section;

a cam member located within said aperture that couples to said elongated member, said cam member having a D-shaped aperture that corresponds to said D-shaped cross-section of said elongated member, said cam member being rotatable along with said elongated member as said first member is moved relative to said second member; and an axially formed slot formed in a wall of said casing that is engaged with said cam member, said slot including at least one detent formed therein, wherein as said cam member is rotated along with said elongated member from a first position to a second position, said cam member moves along said axis through said slot and along a surface of said elongated member to engage with said detent to secure said elongated member in said second position.

12. The hinge assembly of claim 11, further comprising a biasing member disposed in said aperture and coupled to said cam member.

13. The hinge assembly of claim 12, wherein said biasing member is a torsion spring that urges said cam member out of engagement with said detent when said elongated member is moved from said second position back to said first position.

14. The hinge assembly of claim 11, wherein said cam member includes at least one protrusion that engages said slot.

15. The hinge assembly of claim 11, further comprising a seal member disposed between said first hinge member and said second hinge member.

16. The hinge assembly of claim 11, wherein said first member is a vehicle door, and said second member is a vehicle body.

17. The hinge assembly of claim 11, wherein said second hinge member is removable from said first hinge member.

* * * * *